US006503293B1

(12) United States Patent
Dempsey et al.

(10) Patent No.: US 6,503,293 B1
(45) Date of Patent: Jan. 7, 2003

(54) PROCESS FOR THE EXTRACTION OF COPPER

(76) Inventors: Paul Dempsey, 108 Sutton Court, Sutton Court Road, Chiswick W4 3EE (GB); David Bruce Dreisinger, 5233 Bentley Crescent, Delta, British Columbia (CA), V4K 4K2

( * ) Notice: Subject to any disclaimer, the term of this patent is extended or adjusted under 35 U.S.C. 154(b) by 0 days.

(21) Appl. No.: 09/599,429

(22) Filed: Jun. 22, 2000

(30) Foreign Application Priority Data

Jun. 25, 1999 (GB) .............................................. 9914979

(51) Int. Cl.[7] .................................................. C22B 3/08
(52) U.S. Cl. ...................................................... 75/743
(58) Field of Search .......................................... 75/743

(56) References Cited

U.S. PATENT DOCUMENTS

| 3,637,371 A | 1/1972 | Mackiw et al. | |
|---|---|---|---|
| 5,730,776 A | 3/1998 | Collins et al. | |
| 5,874,055 A | 2/1999 | Jones | |
| 5,993,635 A | * 11/1999 | Hourn et al. | ................ 205/568 |

FOREIGN PATENT DOCUMENTS

EP          0 908 525          4/1999

OTHER PUBLICATIONS

Hackl et al.; Article: "Effect of Sulfur–Dispersing Surfactants on the Oxygen Pressure Leaching of Chalcopyrite", Cobre 95 International Conference [vol. III, pp 559–577] (1995).

* cited by examiner

Primary Examiner—Melvyn Andrews
(74) Attorney, Agent, or Firm—Burns, Doane, Swecker & Mathis, LLP (57) ABSTRACT

A process for the extraction of copper from a copper sulphide containing concentrate such as chalcopyrite, involves dispersing the finely divided copper sulphide containing concentrate in an aqueous sulphuric acid solution to form a slurry; providing an effective amount of a suitable surfactant such as lignosol or quebracho; reacting with agitation the slurry and surfactant with free oxygen bearing gas in a pressure vessel at an elevated temperature to extract the copper values from the concentrate to produce the final leach solution containing dissolved copper values and a solid residue; and separating the final leach solution containing the dissolved copper values from the solid residue.

9 Claims, 10 Drawing Sheets

PROCESS FOR THE EXTRACTION OF COPPER

BACKGROUND OF THE INVENTION

This invention relates to a hydrometallurgical process for the extraction of copper from a copper sulphide containing concentrate, including mixed sulphide concentrates, in particular from chalcopyrite.

Generally, researchers have found that chalcopyrite tends to leach slowly and incompletely at lower temperatures (below 100° C.) and that at very high temperatures (above 200° C.) sulphur is fully oxidised to sulphate.

Total sulphur oxidation has the disadvantage of higher oxygen consumption (increasing operating costs), more by-product acid for neutralisation (increased requirement for limestone/lime) and more heat produced in the autoclave per unit concentrate treated (increased dilution cooling necessitates larger autoclaves).

At medium temperatures (approximately 150° C.), copper extraction has generally been incomplete due either to "passivation" of the chalcopyrite surface by a metal-polysulphide layer or due to partially reacted chalcopyrite becoming coated with liquid elemental sulphur. Liquid elemental sulphur may agglomerate resulting in the formation of coarse, difficult to handle particles, which create materials handling and slurry transport difficulties.

Previous attempts have been made at applying the well known zinc sulphide hydrometallurgical pressure leaching process to the recovery of copper from chalcopyrite concentrates, using surfactantsts such as a lignin derivative, a tannin compound such as quebracho, and orthophenylene diamine, to disperse the elemental sulphur formed and to subsequently render the copper extractable, This work demonstrated that the use of sulphur-dispersing surfactants employed in zinc processes cannot be straightforwardly extrapolated to the pressure leaching of copper sulphide concentrates, specifically chalcopyrite. Most of the surfactants tested were considered to decompose too rapidly to be beneficial and the best result was achieved with orthophenylene diamine, resulting in low copper extraction of 80% after 6 hours of pressure leaching. This approach to the treatment of chalcopyrite concentrates was therefore dismissed as being ineffective and has not been applied commercially.

At the present time therefore, despite extensive research conducted into the development of commercially viable hydrometallurgical processes for the extraction of copper from chalcopyrite, pyrometallurgical processes remain the technology of choice.

South African Patent No 96/1547 (equivalent to U.S. Pat. No 5,730,776) teaches a hydrometallurgical process for the extraction of copper from copper sulphide concentrates which includes dispersing finely divided sulphidic copper concentrate in a aqueous sulphuric acid solution to form a slurry, and adjusting the concentration of sulphuric acid whereby it is effective to provide a predetermined copper, iron and acid concentration in a final leach solution; providing an effective amount of finely divided particulate carbonaceous material, compatible with the acid sulphate leach solution, which is operative under the reaction conditions of the following oxidising reaction step, to inhibit the passivation of incompletely leached sulphide particles; reacting, with agitation, the slurry and carbonaceous material with free oxygen bearing gas in a pressure vessel at a temperature effective to produce substantially complete extraction of copper values from the sulphides as soluble copper sulphate and concurrent conversion of a substantial portion of sulphide sulphur associated with the copper values to elemental form; and separating the product leach solution containing the dissolved copper values from the solid residue. The use of surfactants was considered not to be commercially viable, due to decomposition during pressure leaching and the use of carbonaceous material is a key element in the process, U.S. Pat. No 5,874,055 teaches a process for the extraction of copper from a sulphide copper ore or concentrate which comprises the steps of subjecting the ore or concentrate to pressure oxidation in the presence of oxygen and an acidic halide solution to obtain a resulting pressure oxidation slurry, and subjecting the slurry to a liquid/solid separation step to obtain a resulting pressure oxidation filtrate and a solid residue containing an insoluble basic copper sulphate salt, The pressure oxidation is conducted in the presence of a source of bisulphate or sulphate ions which is selected from the group consisting of sulphuric acid and a metal sulphate which hydrolyses in the acidic solution. The amount of source of bisulphate or sulphate ions which is added contains at least the stoichiornetric amount of sulphate or bisulphate ions required to produce the basic copper sulphate salt, less the amount of sulphate generated in situ in the pressure oxidation.

The process further comprises the steps of recyling the pressure oxidation filtrate to the pressure oxidation; leaching the solid residue containing the basic copper sulphate salt in a second leaching with an acidic sulphate solution to dissolve the basic copper salt to produce a leach liquor containing copper sulphate in solution and a resulting solid residue; separating the leach liquor from the solid residue; subjecting the leach liquor to a solvent extraction process to produce copper concentrate solution and a raffinate; and recycling the raffinate to the second leaching.

It is to be noted that this process requires the use of an acidic halide solution in the pressure oxidation stage, and that the copper is recovered from the pressure oxidation stage in the form of an insoluble basic copper sulphate salt.

In an article entitled "Effect of sulfur-dispersing surfactants on the oxidation pressure leaching of chalcopyrite" by Hackl et al, proceedings of COPPER 95-COBRE 95-COBRE 95 International Congress, Volume 3, Electrorefining and Hydrometallurgy of Copper, The Metallurgical Society of CIM, Montreal, Canada, the feasibility of using molten sulphur-dispersing surfactants to enhance the oxygen pressure leaching of chalcopyrite in the temperature range 125–155° C. was investigated. The article concluded that most of the surfactants tested decomposed too rapidly to be of benefit. The best results were obtained with orthophenylenediamine (OPD) when it was added continuously during a test at fairly high dosage (50 kg/t). This resulted in significant increases in copper extraction, but only after prolonged retention times (6 hours). Chalcopyrite leached slowly even if molten sulphur was prevented from wetting the mineral surfaces. It was concluded the reaction rate is ultimately controlled by a passivating mechanism unrelated to elemental sulphur formation.

Despite all the known processes for the leaching of copper values from chalcopyrite, there is always a need for new processes of this type.

SUMMARY OF THE INVENTION

According to the invention there is provided a process for the extraction of copper from a copper sulphide containing concentrate, which comprises:

(a) dispersing finely divided copper sulphide containing concentrate having a P80 (80% of particles passing size) of from 5 micron to 20 micron inclusive in an aqueous sulphuric acid solution to form a slurry, the sulphuric acid being provided in an amount determined by the target copper, iron and acid concentration desired in a final leach solution;

(b) providing an effective amount of a suitable surfactant;

(c) reacting, with agitation, the slurry and surfactant with free oxygen bearing gas at an oxygen overpressure of from 100 kPa to 3000 kPa inclusive, preferably of from 400 kPa to 750 kPa inclusive, in a pressure vessel at a temperature of from 130° C. to 160° C. inclusive, to extract the copper values from the concentrate to produce the final leach solution containing dissolved copper values and a solid residue; and (d) separating the final leach solution containing the dissolved copper values from the solid residue.

The final leach solution also contains other dissolved metal values. The final leach solution is then treated downstream to recover copper and other precious and base metal values.

The process is applicable to copper sulphide containing concentrates, the most important of which are those of the refractory chalcopyrite ($CuFeS_2$); chalcocite ($Cu_2S$); bornite ($CuFeS_4$); and covellite (CuS), and the less abundant enargite ($Cu_2AsS_4$) or tetrahedrite ($Cu_{12}Sb_4S_{13}$).

As indicated above, the sulphuric acid must be present in the slurry in an amount determined by the target copper, iron and acid concentration desired in the final leach solution, The acid to be added is determined relative to the elemental sulphur and sulphate yields required; sulphate is mainly in the form of copper sulphate, ferric sulphate and some ferrous sulphate. A stoichiometric amount of acid is required to ensure the required conversion, together with sufficient acid in the final leach solution to ensure target metal recoveries are maintained, The surfactant (or surface active agent) used may be any suitable surfactant, including organic compounds such as lignin derivatives, particularly calcium and sodium lignosulphonates; tannin compounds, particularly tree bark and heartwood extracts such as quebracho, hemlock and redwood extracts; orthophenylene diamine; and alkanyl sulphonates, particularly sodium alkylbenzene sulphonates, and mixtures of two or more thereof. The surfactant is preferably present in an amount of from 2 to 5 kg inclusive per tonne of concentrate.

The leaching reaction is carried out in an agitated pressure vessel at a temperature of from 130° to 160° C. inclusive and preferably at about 150° C. Oxygen bearing gas is introduced into the pressure vessel (autoclave) to maintain an oxygen overpressure of from 100 kPa to 3000 kPa inclusive and preferably from 400 kPa to 750 kPa inclusive. Oxygen is preferred as the oxidising gas but oxygen enriched air may also be used.

It is to be noted that the process of the invention is carried out without the addition of an acidic halide solution.

DESCRIPTION OF EMBODIMENTS

The crux of the invention is a process for the hydrometallurgical extraction of copper from a copper sulphide containing concentrate, particularly chalcopyrite, using a surfactant to assist in the process.

The process will now be illustrated in more detail in the following experimental work.

Experimental Work

The objectives of the experimental work were to demonstrate that Copper can be effectively leached from chalcopyrite concentrates employing fine grinding of the concentrate to a P80 of between 5 μm and 20 μm, at 150° C., with addition of a sulphur dispersing surfactant such as lignosol which is a lignosulphonate, quebracho (or mixtures of lignosol and quebracho) or orthophenylene diamine (OPD) in a pressure leach autoclave with an oxygen overpressure (provided by oxygen gas) of 7 atmospheres. Factors evaluated during the experimental phase were, confirmation that the process could be used on a variety of chalcopyrite containing concentrates;

impact of particle size, acid addition and surfactant type and dosage to the performance of the leach;

gold and silver extraction by cyanidation of the autoclave residue;

effect of surfactant addition on the organic/aqueous separation behaviour in subsequent solvent extraction.

Copper is extracted to +98%, often in 2 hours, with much of the sulphur preserved as elemental sulphur and iron oxidised and precipitated as haematite.

Four types of concentrate containing chalcopyrite were obtained for evaluation. Acid additions in the range of 125–225 kg/tonne were tested (extra acid addition to return raffinate) and a number of experiments were done with no extra acid addition (only acid in raffinate was returned to leach). Particle size effects were determined in the P80 range of 5 to 20 μm. Lignosol, quebracho and orthophenylene diamine were studied to determine the effect of surfactant type and dosage on the leaching process. Cyanidation experiments were performed directly on the washed autoclave leach residues without attempting to remove elemental sulphur.

Experimental

Preparation of the Ores

Two kinds of copper concentrates, namely Hudson Bay and Custom, were obtained from Hudson Bay Mining and Smelting Co. Ltd. These two samples were mixed together at the ratio of 3 (Hudson Bay) to 1 (Custom). Batches of 2 kg mixed samples were further wet ground to between 5 and 20 μm. Another three copper chalcopyrite concentrate samples were sourced to further demonstrate the process: Concentrate A, Concentrate B and Concentrate C which also contained nickel. After grinding, the slurry was filtered, and air dried in a fume hood at room temperature. Each head sample was analysed. The result of the head assays are shown in Table 1.

TABLE 1

Head Assay Values for Reground Concentrate Samples

| Sample | Size (μm) | Cu % | Fe % | Ni | S° % | Total S % |
|---|---|---|---|---|---|---|
| Hudson Bay 10-1 | 10.01 | 28.4 | 30.5 | — | 0.02 | 31.9 |
| Hudson Bay 10-2 | 5.28 | 28.8 | 29.2 | — | <0.01 | 30.9 |
| Hudson Bay 15 | 13.04 | 28.8 | 30.0 | — | 0.01 | 32.1 |
| Hudson Bay 20 | 17.93 | 28.8 | 29.6 | — | 0.01 | 32.8 |
| Concentrate A | 7.36 | 26.4 | 33.4 | — | 0.15 | 35.1 |
| Concentrate B | 11.46 | 27.2 | 31.3 | | 0.01 | 31.3 |
| Concentrate C | 10.60 | 1.84 | 11.6 | 3.4 | 0.06 | 8.1 |

TABLE 1-continued

Head Assay Values for Reground Concentrate Samples

| Sample | | | | | | |
|---|---|---|---|---|---|---|
| Concentrate C | 15.20 | 1.84 | 11.6 | 3.4 | 0.06 | 8.1 |
| Concentrate C | 19.28 | 1.84 | 11.6 | 3.4 | 0.06 | 8.1 |

| Sample | $S^{2-}$ % | Si % | Pb % | Zn % | Au g/T | Ag g/T |
|---|---|---|---|---|---|---|
| Hudson Bay 10-1 | 31.9 | 3.32 | 0.396 | — | 16.2 | 176 |
| Hudson Bay 10-2 | 30.6 | 4.06 | 0.392 | — | 15.0 | 195 |
| Hudson Bay 16 | 32.1 | 4.14 | 0.408 | 4.20 | 15.2 | 184 |

TABLE 1-continued

Head Assay Values for Reground Concentrate Samples

| Sample | | | | | | |
|---|---|---|---|---|---|---|
| Hudson Bay 20 | 32.8 | — | — | — | — | — |
| Concentrate A | 34.9 | 1.28 | 1.270 | 2.96 | 0.05 | 479 |
| Concentrate B | 31.0 | 7.10 | 0.016 | 0.04 | 0.3 | 30.7 |
| Concentrate C | 7.7 | ND | ND | 0.07 | — | — |

Pressure Oxidation—Hudson Bay, Concentrate A and Concentrate B Samples

Pressure oxidation was performed with a slurry consisting of 180 gram of solid and 1.2 liter solution. The initial solution contained 3 g/L Cu(II), 3 g/L Fe(II), 3 g/L Fe(III) and 50 g/L $H_2SO_4$. This solution was intended to represent a raffinate solution obtained from solvent extraction. Surfactants and extra sulphuric acid were added to each slurry as required by the test condition before the autoclave was sealed, The autoclave was then heated up to 150° C. with agitation of 650 rpm.

The autoclave conditions were:

| Temperature | 150° C. |
|---|---|
| Oxygen overpressure 7 atm. | (103 ps i) |
| Stirring speed | 1000 rpm |

Slurry samples (about 50 ml each time) were withdrawn periodically through the dip tube from the autoclave during a run. The withdrawn sample was cooled immediately to room temperature (less than 5 seconds), then filtered and washed thoroughly. The filtered residue was dried in a vacuum oven at 50° C. over night.

The volume of each sample withdrawn was determined by the weight difference between the slurry and the dried residue. When the test ended, the autoclave was cooled quickly, the slurry was filtered and washed thoroughly. The wet cake was dried in an oven at 50° C. overnight. The solution samples and solid samples were analysed.

A total of seventeen pressure leach tests were performed. The conditions for each test are reported in Table 2.

TABLE 2

Conditions of autoclave leach

| Test ID | Sample | Size, μm | Surfactant | Extra Acid, g/T | Time, hr | Temp, ° C. | $PO_2$, ps i |
|---|---|---|---|---|---|---|---|
| Test 1 | Hudson Bay | 10.01 | OPD | 125 | 4 | 150 | 103 |
| Test 2 | Hudson Bay | 10.01 | QL | 125 | 4 | 150 | 103 |
| Test 3 | Hudson Bay | 10.01 | QL | 175 | 4 | 150 | 103 |
| Test 4 | Hudson Bay | 10.01 | QL | 225 | 4 | 150 | 103 |
| Test 5 | Hudson Bay | 5.28 | OPD | 175 | 4 | 150 | 103 |
| Test 6 | Concentrate A | 7.36 | OPD | 175 | 4 | 150 | 103 |
| Test 7 | Concentrate A | 7.36 | QL | 175 | 4 | 150 | 103 |
| Test 8 | Concentrate B | 11.46 | OPD | 175 | 4 | 150 | 103 |
| Test 9 | Concentrate B | 11.46 | QL | 175 | 4 | 150 | 103 |
| Test 10 | Hudson Bay | 13.04 | QL | No | 2 | 150 | 103 |
| Test 11 | Hudson Bay | 17.93 | QL | No | 2 | 150 | 103 |
| Test 12 | Hudson Bay | 5.28 | QL | No | 2 | 150 | 103 |
| Test 13 | Hudson Bay | 5.28 | OPD | 225 | 4 | 150 | 103 |
| Test 14 | Hudson Bay | 5.28 | Q | No | 2 | 150 | 103 |
| Test 15 | Hudson Bay | 5.28 | L | No | 2 | 150 | 103 |
| Test 16 | Hudson Bay | 5.28 | More QL | No | 2 | 150 | 103 |
| Test 17 | Hudson Bay | 5.28 | Less QL | No | 2 | 150 | 103 |

Note:
OPD - orthophenylene diamine; Q - quebracho; L - lignosol.

Cyanidation

All residues generated by pressure oxidation for the mixed Hudson Bay samples were leached by cyanide in the presence of carbon for 24 hours. The conditions of cyanidation were:

| Pulp density: | 15% |
|---|---|
| Solid weight: | 75 gram |
| Concentration of cyanide: | 0.08% |

During the cyanidation, the samples taken at 1, 2, 4, and 8 hours were titrated for the concentration of free cyanide. Additional NaCN was then added in order to keep the concentration of cyanide at 0.08%. The residue and carbon from each cyanidation test were analysed for gold and silver content to determine extraction.

Solvent Extraction Phase Separation

The objective of the phase separation tests was to find the effect of the agitation speed on the phase separation time for the different solutions during solvent extraction of copper. Three tests were conducted, and each test was run under the speed range of 300 to 900 rpm in the step of 100 rpm. The ratio of the diameter of the impeller to the diameter of the reactor is 0.47, and the distance of impeller to the bottom of the reactor is 0.3 inch (0.76 cm). Other conditions of the tests are shown in Table 3.

TABLE 3

Conditions of tests

| Test ID | Conditions |
|---|---|
| Test 1 | Synthetic solution + organic |
| Test 2 | Pox liquor + organic |
| Test 3 | Synthetic solution + organic + fresh surfactants |

Synthetic solution, which was prepared using reagent grade chemicals based on the concentration of the pressure oxidation (POX) liquor, contained 64 g/L $Cu^{2+}$, 1.5 g/L $Fe^{3+}$, and 23 g/L $H_2SO_4$. POX liquor was obtained from the run of 2 hours pressure oxidation of the mixed Hudson Bay copper concentrate (5.28 μm). Organic composition was 30% of Lix 984 (extractant) in Exxsol D-80 (diluent). Fresh surfactants additions were 0.36 g of quebracho and 0.18 g of lignosol added to 1 L of solution. The procedure of each test is listed as follows:

1. Add 400 ml of organic and 400 ml aqueous (POX liquid phase) into a 1.5 L beaker, and mark the boundary line of the two phases on the beaker when the two phases were separated completely;
2. Mix for 5 minutes at the certain speed, which was determined by a tachometer, then start timing as soon as agitation was stopped;
3. Record the time when the boundary line of 2 phase reaches to the marker;
4. Repeat each agitation speed for 3 times to get the average number, then go on to next speed. Each test was conducted from low agitation speed to high speed.

Results

The results from the pressure leaching and cyanidation tests are shown in Table 4.

TABLE 5

The effect of the agitation speed on the phase separation time for the different solutions

| Speed rpm | Time for Test 1 Sec. | Time for test 2 sec. | Time for test 3 sec. |
|---|---|---|---|
| 300 | 49 | 52 | 133 |
| 400 | 70 | 118 | 168 |
| 500 | 136 | 151 | 212 |
| 600 | 157 | 166 | 556 |
| 700 | 170 | 168 | 690 |
| 800 | 170 | 170 | 690 |
| 900 | 170 | 170 | 690 |

The particular reaction conditions for each of Tests 1 to 17 are set out below. The oxygen consumption versus time is illustrated for each test in FIGS. 1 to 17.

Figure 1:
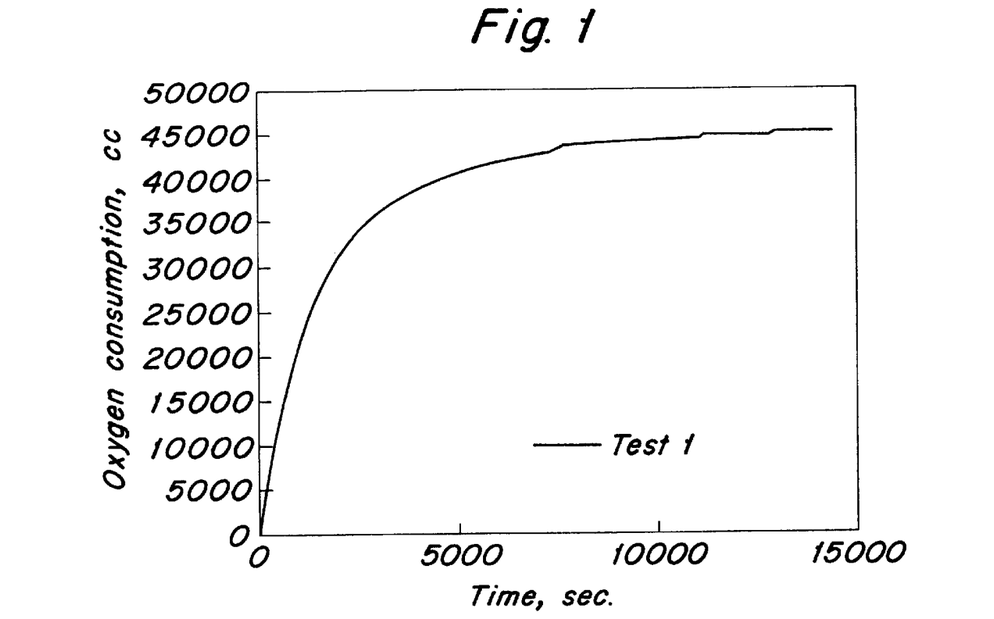
FIGS. 1 to 17 are graphs of oxygen consumption versus time in respect of Tests 1 to 17 as described in the Experimental Work.
Figure 2:
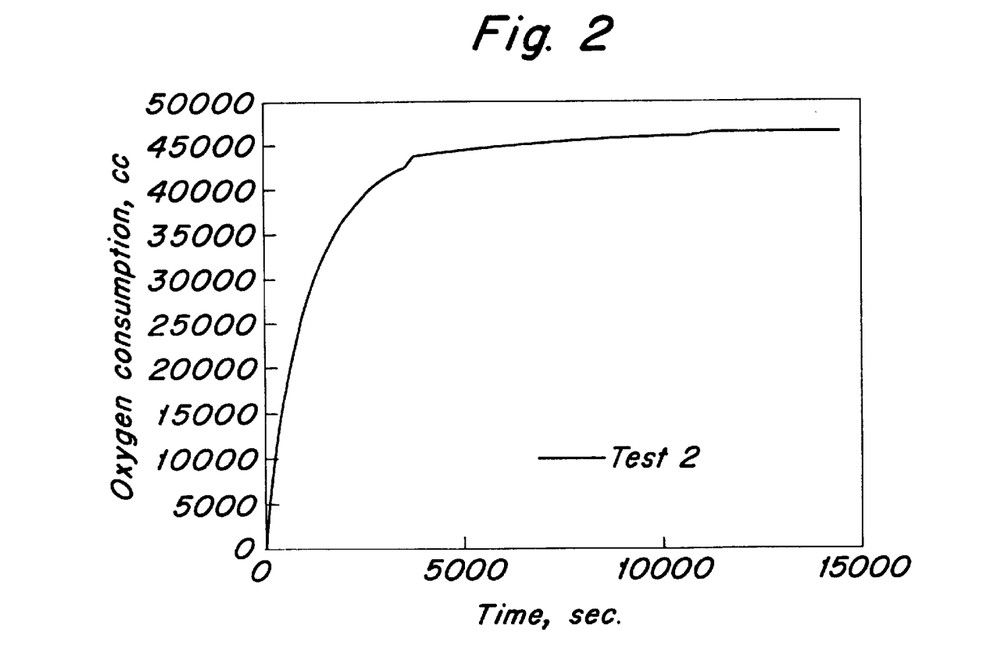

FIG. 1. Oxygen Consumption Versus Time for Test 1. 180 g of 10.01 μm Hudson Bay mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 23.44 g extra concentrated $H_2SO_4$ (125 kg/T) and 0.54 g of OPD under 150° C., 103 psi of $Po_2$ 1000 rpm, 4 hours, FIG. 2. Oxygen Consumption Versus Time for Test 2. 180 g of 10.01 μm Hudson Bay mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 23.44 g extra concentrated $H_2SO_4$ (125 kg/T) and 0.36 g of Quebracho and 0.18 g of Lignosol under 150° C., 103 psi of $Po_2$ 1000 rpm, 4 hours.

Figure 3:
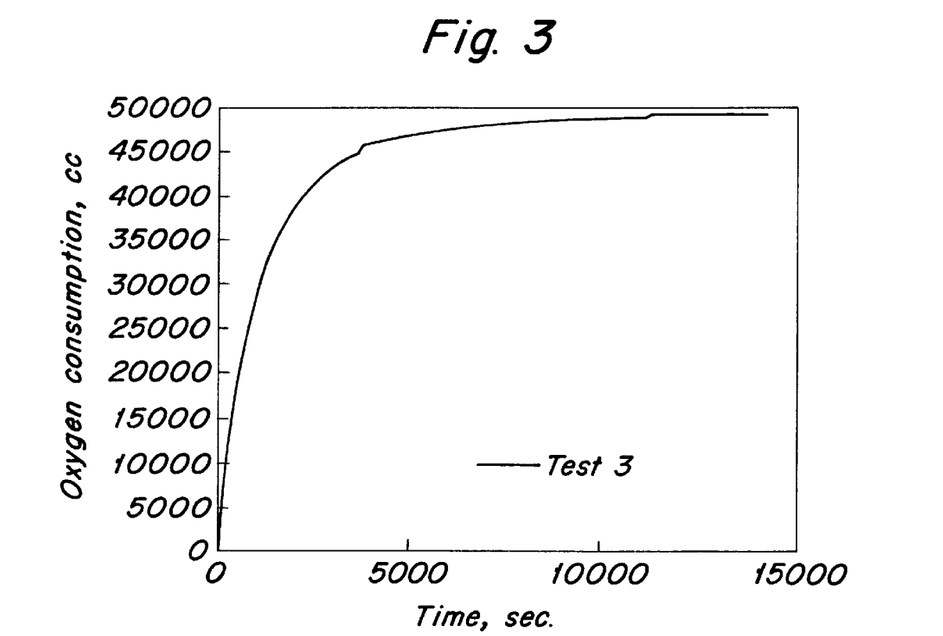

FIG. 3. Oxygen Consumption Versus Time for Test 3. 180 g of 10.01 μm Hudson Bay mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 32.8 g extra concentrated $H_2SO_4$ (175 kg/T) and 0.36 g of Quebracho and 0.18 g of Lignosol under 150° C., 103 psi of $Po_2$ 1000 rpm, 4 hours.

TABLE 4

Results from Pressure Leach and Cyanidation Tests

| Test | Surfactant and Dosage (kg/t) Queb. | Lign. | OPD | Copper Extraction (%) 1 hour | 2 hour | 3 hour | 4 hour | Sulphide Oxidation (%) | S(elem) Yield (%) | Au Ext. (%) | Ag Ext. (%) | CaO (kg/t Res) | NaCN (kg,t Res) |
|---|---|---|---|---|---|---|---|---|---|---|---|---|---|
| 1 | | | 3 | 74,48 | 91,08 | 97,03 | 97,9 | 98,53 | 65,20 | 80,65 | 38,91 | 32,64 | 19,44 |
| 2 | 1 | 2 | | 92,47 | 97,79 | 98,35 | 98,7 | 99,21 | 70,44 | 80,98 | 51,46 | 37,68 | 19,82 |
| 3 | 1 | 2 | | 91,02 | 97,80 | 98,64 | 99,0 | 99,32 | 71,04 | 86,33 | 47,38 | 36,72 | 20,39 |
| 4 | 1 | 2 | | 89,67 | 97,86 | 98,88 | 99,1 | 99,35 | 68,14 | 80,00 | 39,75 | 36,72 | 20,60 |
| 5 | | | 3 | 79,74 | 93,28 | 98,11 | 98,1 | 99,49 | 64,40 | 88,77 | 46,07 | 35.04 | 19,58 |
| 6 | | | 3 | 79,30 | 95,16 | 98,32 | 97,6 | 99,25 | 63,68 | | | | |
| 7 | 1 | 2 | | 92,08 | 98,06 | 95,82 | 98,7 | 99,77 | 67,41 | | | | |
| 8 | | | 3 | 77,16 | 91,03 | 95,98 | 97,3 | 99,82 | 60,48 | | | | |
| 9 | 1 | 2 | | 91,32 | 96,40 | 97,36 | 97,4 | 99,52 | 67,17 | | | | |
| 10 | 1 | 2 | | 90,44 | 96,95 | | | 98,81 | 70,01 | 91,53 | 54,02 | 34,56 | 19,75 |
| 11 | 1 | 2 | | 79,55 | 80,56 | | | 83,01 | 59,06 | 90,09 | 61,20 | 33,84 | 18,90 |
| 12 | 1 | 2 | | 96,76 | 98,57 | | | 99,74 | 68,92 | 95,19 | 60,50 | 35,52 | 20,89 |
| 13 | | | 3 | 84,12 | 95,21 | 98,47 | 99,0 | 99,60 | 77,02 | 91,58 | 43,72 | 35,52 | 20,45 |
| 14 | 3 | | | 93,36 | 98,33 | | | 99,62 | 67,96 | 94,41 | 61,68 | 33,12 | 20,99 |
| 15 | | 3 | | 92,79 | 96,89 | | | 98,67 | 79,79 | 86,16 | 59,11 | 33,10 | 20,58 |
| 16 | 1,5 | | 3 | 95,09 | 98,25 | | | 99,71 | 73,85 | 87,72 | 57,44 | 32,88 | 20,87 |
| 17 | 0,5 | | 1 | 91,08 | 95,50 | | | 96,82 | 65,38 | 94,41 | 75,65 | 32,64 | 20,33 |

Results of the phase separation tests (with and without surfactants present) are shown in Table 5.

Figure 4:
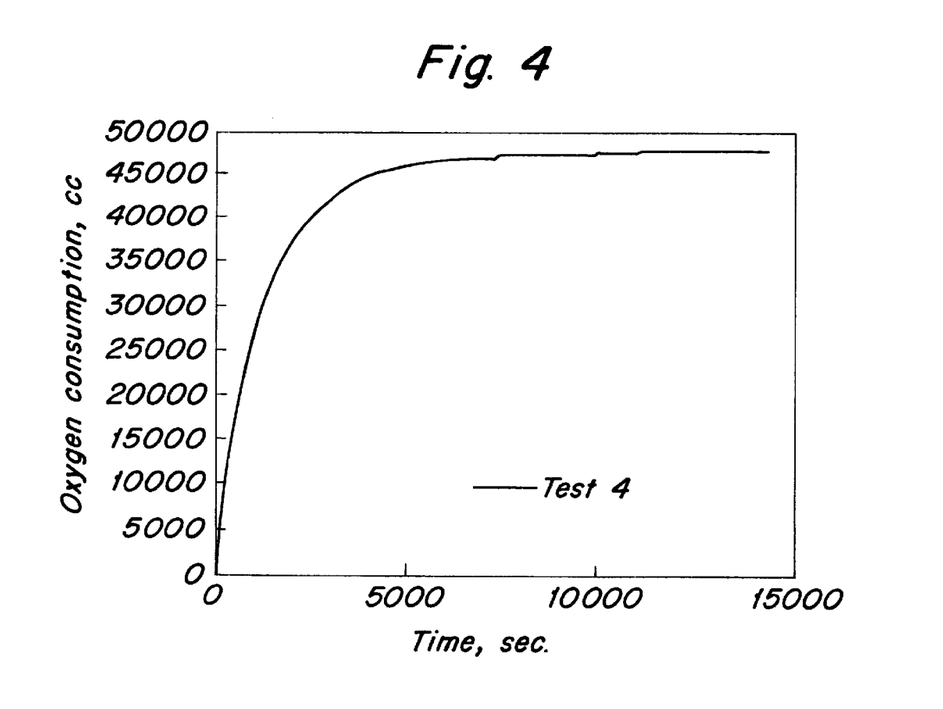

FIG. 4. Oxygen Consumption Versus Time for Test 4. 180 g of 10.01 μm Hudson Bay mixed copper concentrate in 1.2

L solution containing 3 g/L of $Cu^{2+}$, 3 g/L of $Fe^{2+}$, 3 g/L of $Fe^{3+}$, and 50 g/L of $H_2SO_4$ with 42.8 g extra concentrated $H_2SO_4$ (255 kg/T) and 0.36 g of Quebracho and 0.18 g of Lignosol under 150° C., 103 psi of $P_{O_2}$ 1000 rpm, 4 hours.

Figure 5:
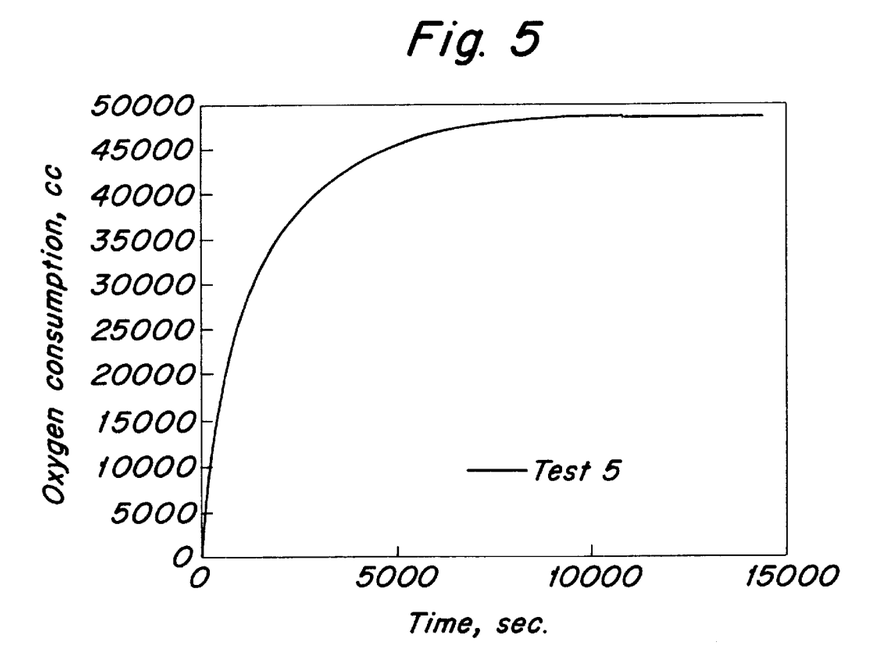

FIG. 5. Oxygen Consumption Versus Time for Test 5. 180 g of 5.28 μm Hudson Bay mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 32.8 g extra concentrated $H_2SO_4$ (175 kg/T) and 0.54 g OPD under 150° C., 103 psi of $P_{O_2}$, 1,000 rpm, 4 hours.

Figure 6:
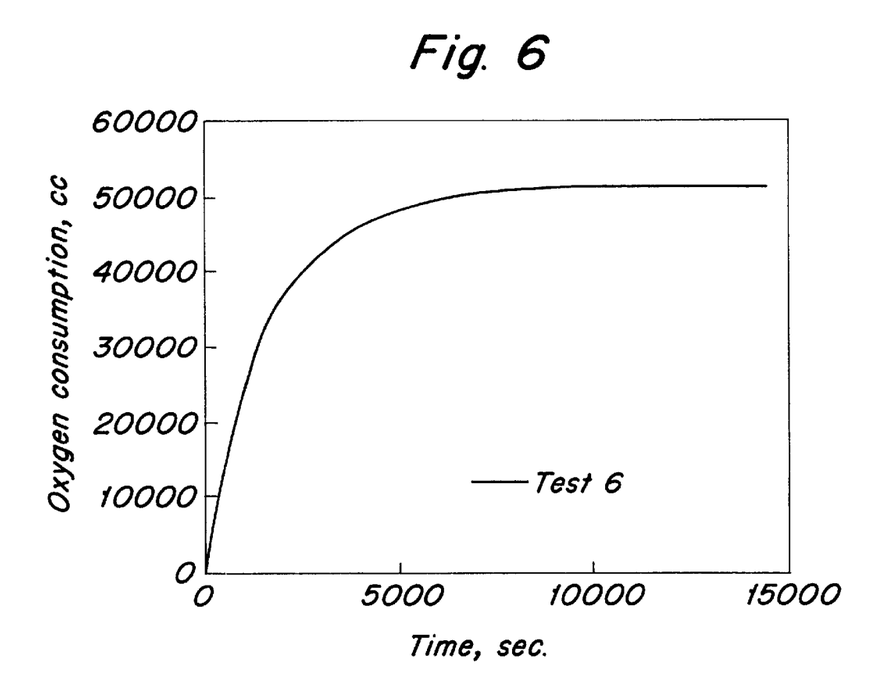

FIG. 6. Oxygen Consumption Versus time for Test 6. 180 g of 7.36 μm Concentrate A copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 32.8 g extra concentrated $H_2SO_4$ (175 kg/T) and 0.54 g of OPD under 150° C., 103 psi of $P_{O_2}$, 1000 rpm, 4 hours.

Figure 7:
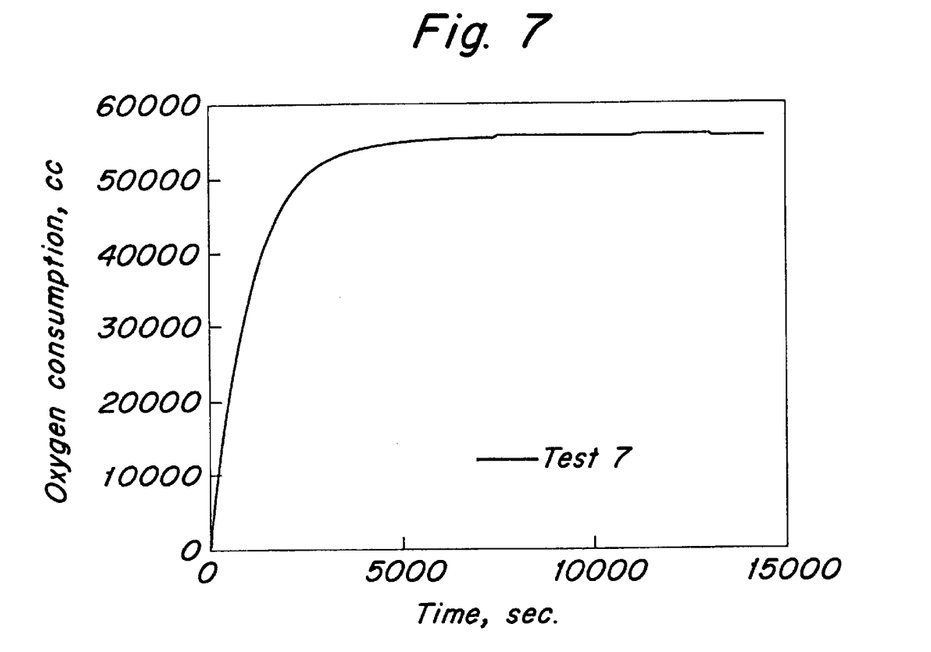

FIG. 7. Oxygen Consumption Versus Time for Test 7. 180 g of 7.36 μm Concentrate A copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 32.8 g extra concentrated $H_2SO_4$ (175 kg/T) and 0.36 g of Quebracho and 0.18 g of Lignosol under 150° C., 103 psi of $P_{O_2}$, 1,000 rpm, 4 hours.

Figure 8:
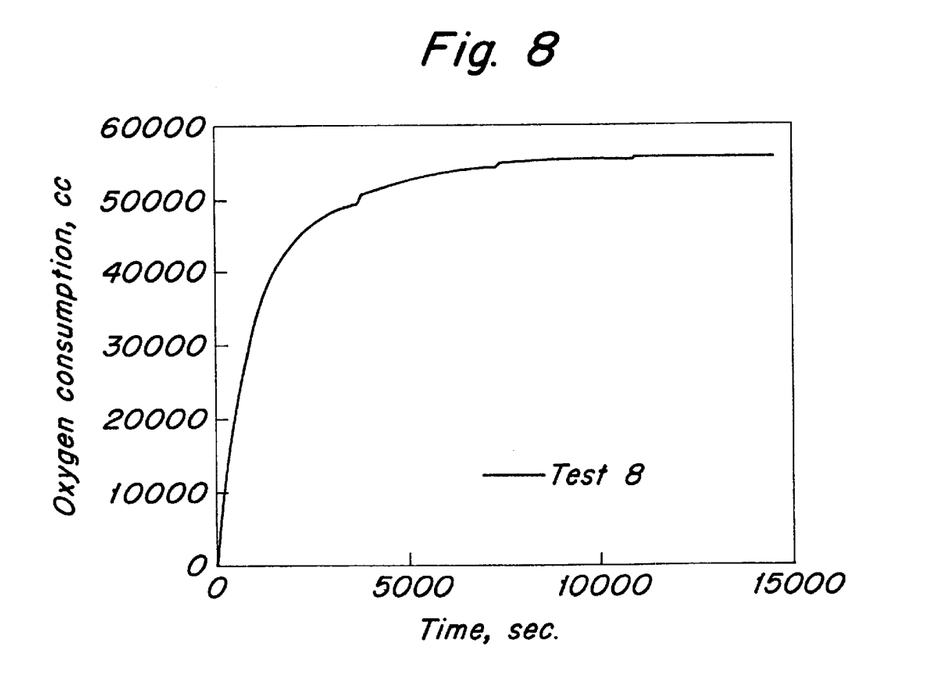

FIG. 8. Oxygen Consumption Versus Time for Test 8. 180 g of 11.46 μm Concentrate B copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 32.8 g extra concentrated $H_2SO_4$ (175 kg/T) and 0.54 g of OPD under 150° C., 103 psi of $P_{O_2}$, 1000 rpm, 4 hours.

Figure 9:
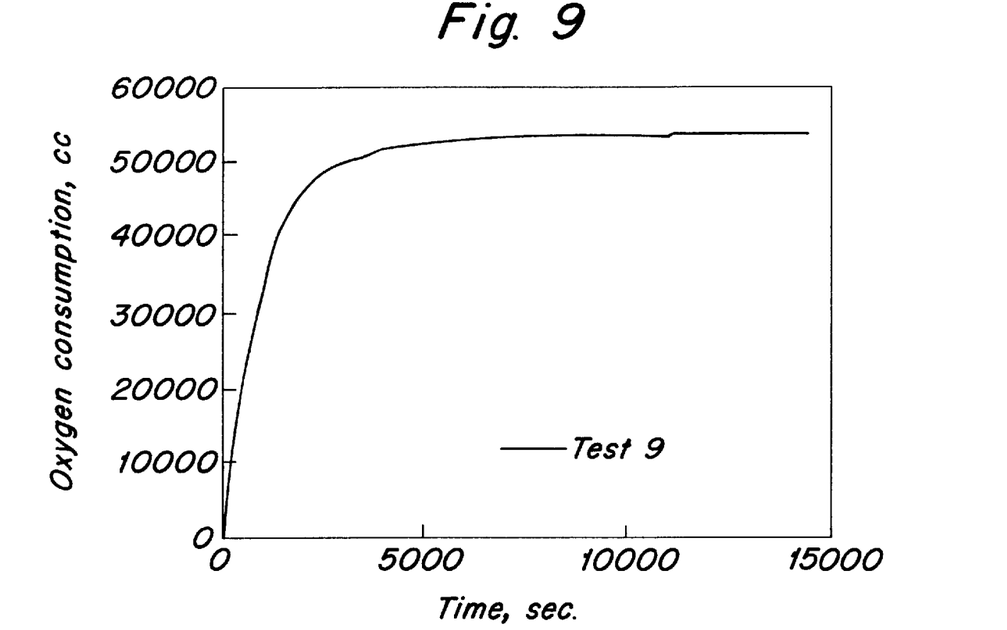

FIG. 9. Oxygen Consumption Versus Time for Test 9. 180 g of 11.46 μm Concentrate B copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 32.8 g extra concentrated $H_2SO_4$ (175 kg/T) and 0.36 g of Quebracho and 0.18 g of Lignosol under 150° C., 103 psi of $P_{O_2}$, 1000 rpm, 4 hours.

Figure 10:
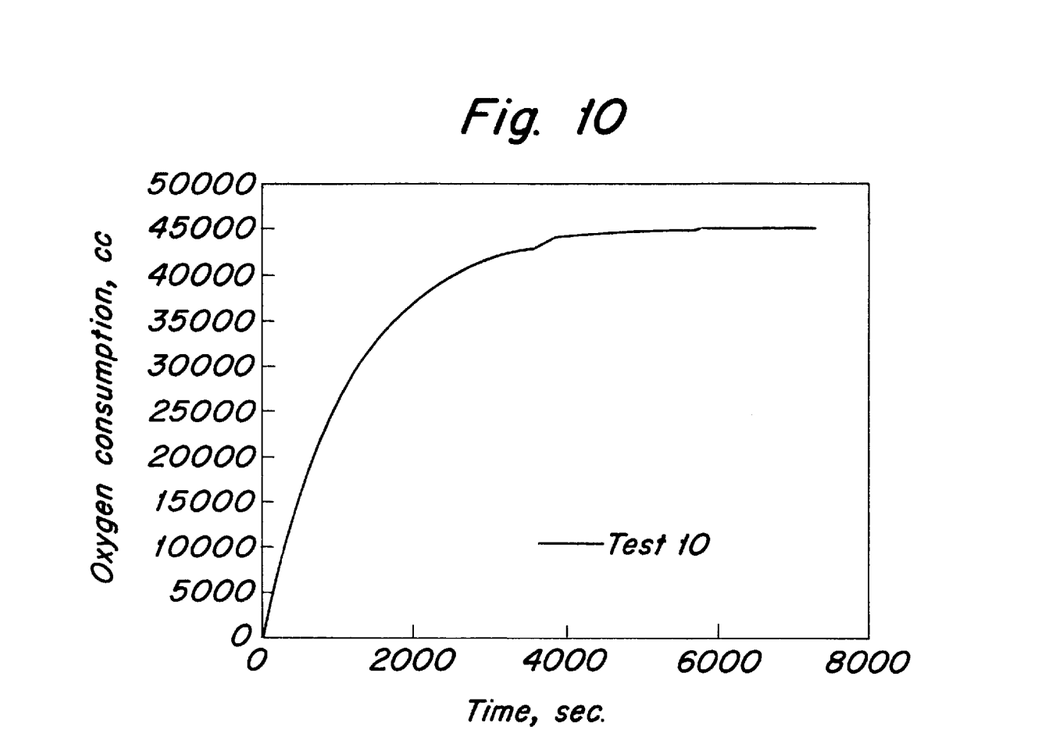

FIG. 10. Oxygen Consumption Versus Time for Test 10. 180 g of 13.04 μm Hudson Bay Mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ without extra acid and 0.36 g of Quebracho and 0.18 g of Lignosol under 150° C., 103 psi of $P_{O_2}$, 1000 rpm, 2 hours.

Figure 11:
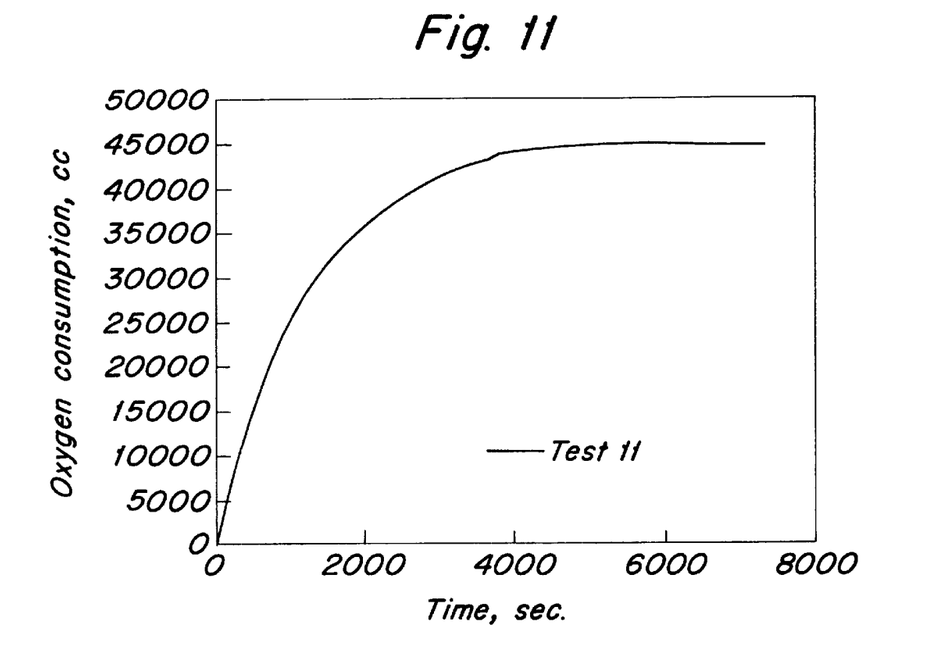

FIG. 11. Oxygen Consumption Versus Time for Test 11. 180 g of 17.93 μm Hudson Bay Mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ without extra acid and 0.36 g of Quebracho and 0.18 g of Lignosol under 150° C., 103 psi of $P_{O_2}$, 1000 rpm, 2 hours.

Figure 12:
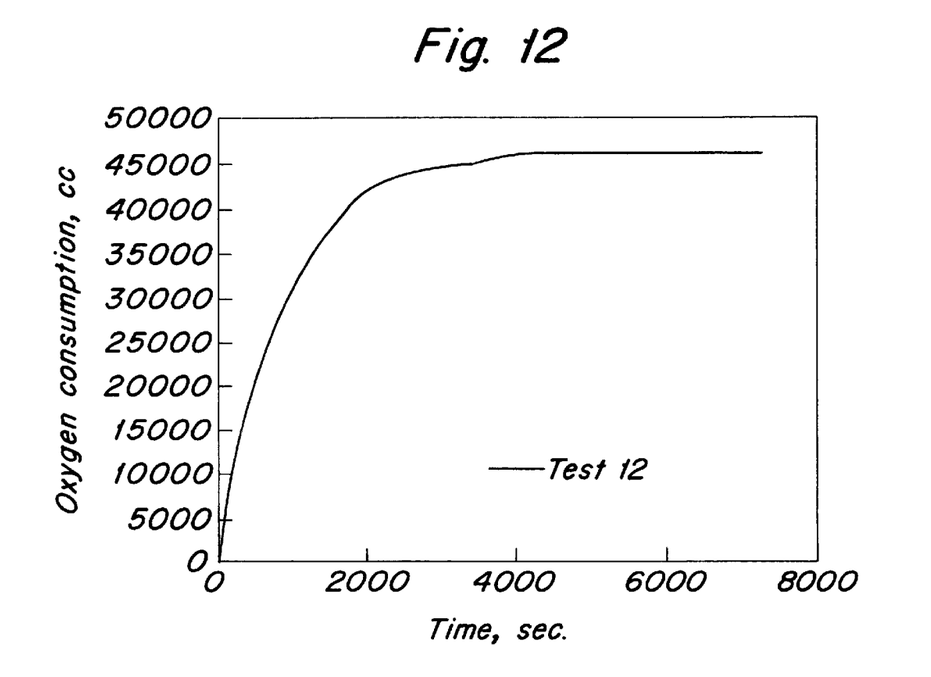

FIG. 12. Oxygen Consumption Versus Time for Test 12. 180 g of 5.28 μm Hudson Bay Mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ without extra acid and 0.36 g of Quebracho and 0.18 of Lignosol under 150° C., 103 psi of $P_{O_2}$, 1000 rpm, 2 hours.

Figure 13:
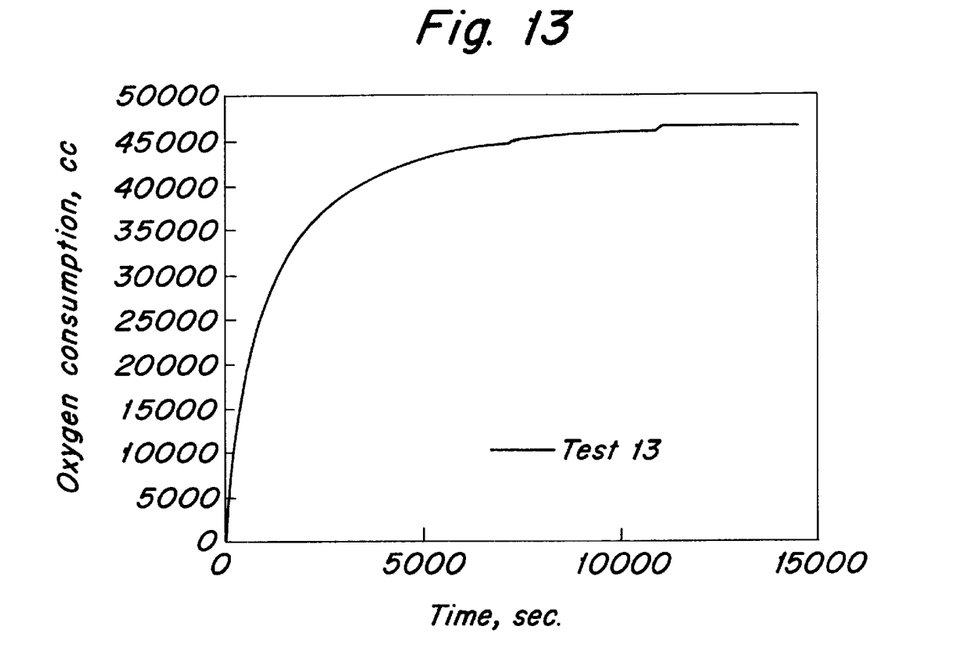

FIG. 13. Oxygen Consumption Versus Time for Test 13. 180 g of 5.28 μm Hudson Bay mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ with 42.2 g extra concentrated $H_2SO_4$ (225 kg/T) and 0.54 g of OPD under 150° C., 103 psi of $P_{O_2}$, 1000 rpm, 4 hours.

Figure 14:
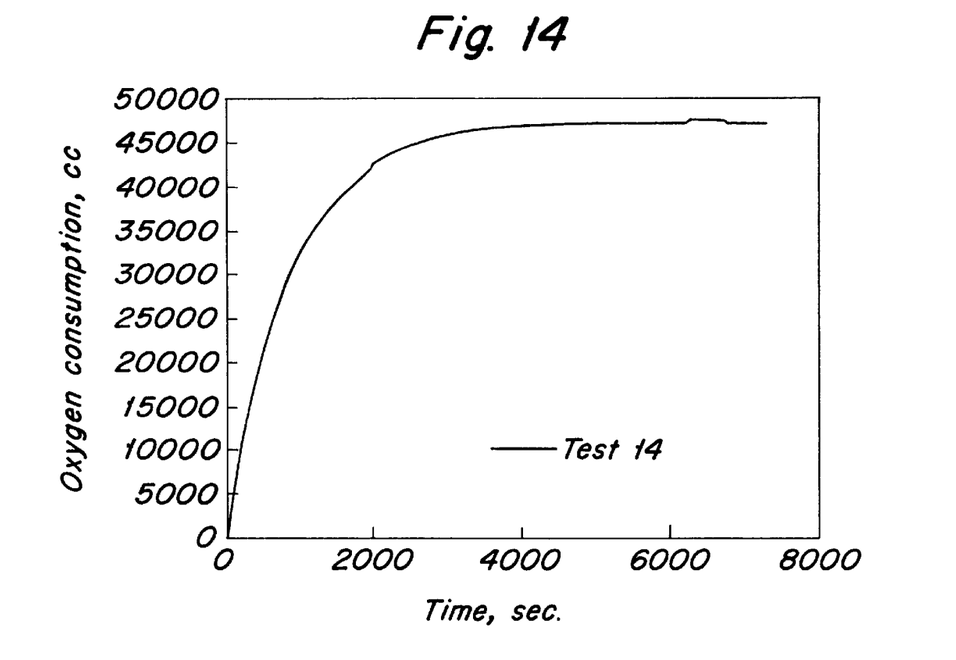

FIG. 14. Oxygen Consumption Versus Time for Test 14. 180 g of 5.28 μm Hudson Bay Mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ without extra acid and 0.54 g of Quebracho only under 150° C., 103 psi of $P_{O_2}$, 1000 rpm, 2 hours.

Figure 15:
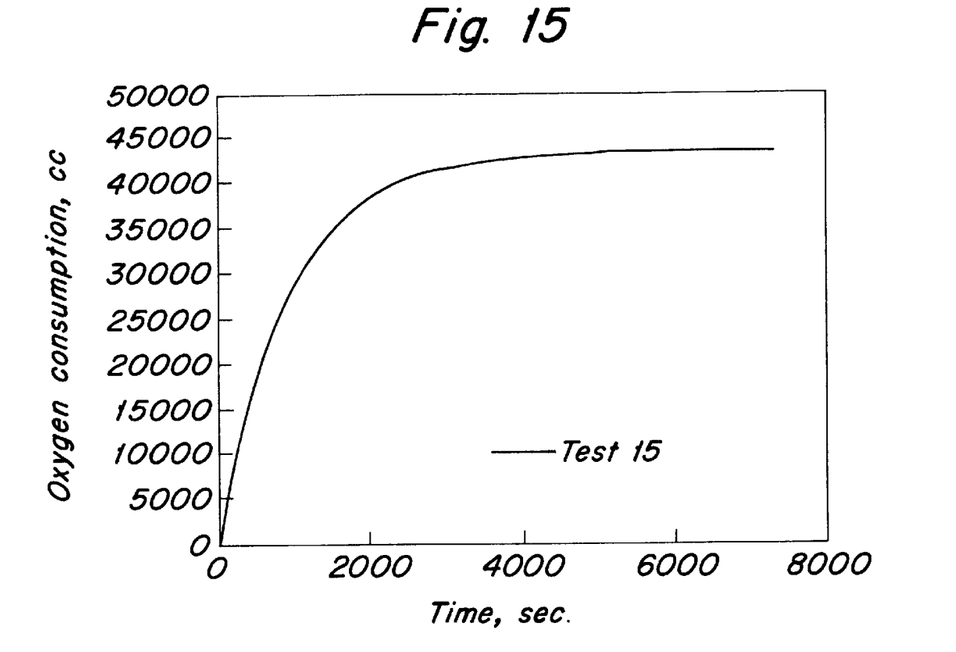

FIG. 15. Oxygen Consumption Versus Time for Test 15. 180 g of 5.28 μm Hudson Bay Mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ without extra acid and 0.54 g of Lignosol only under 150° C., 103 psi of $P_{O_2}$, 1000 rpm, 2 hours.

Figure 16:
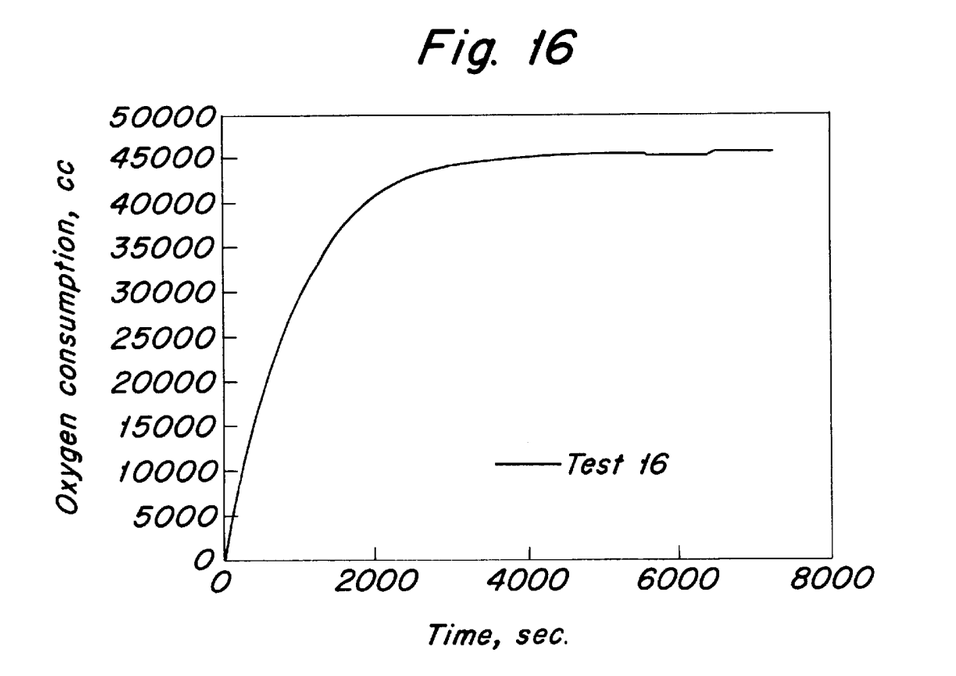

FIG. 16. Oxygen Consumption Versus Time for Tests 16. 180 g of 5.28 μm Hudson Bay Mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ without extra acid and 0.54 g of Quebracho and 0.27 of Lignosol under 150° C., 103 psi of $P_{O_2}$, 1000 rpm, 2 hours.

Figure 17:
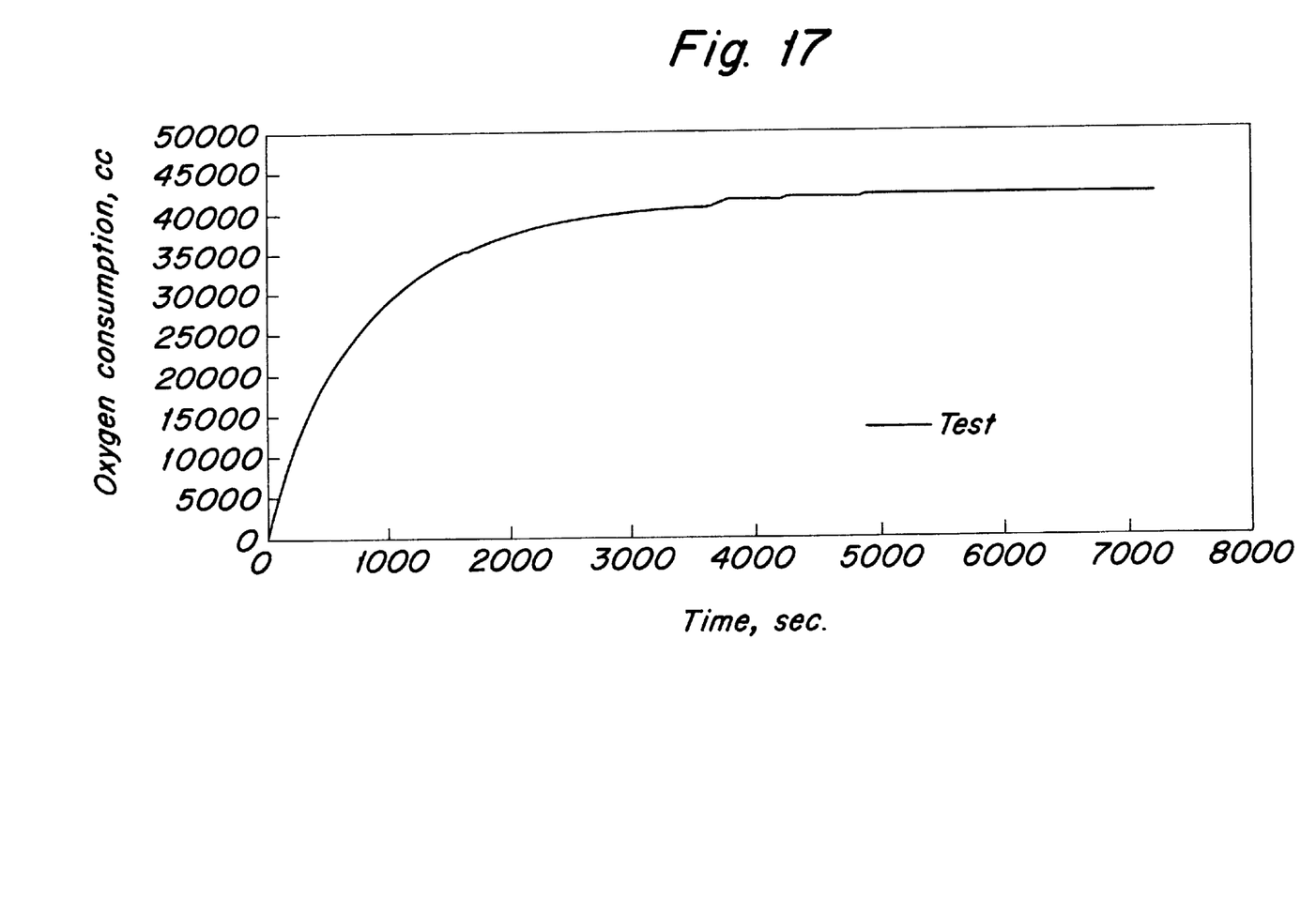

FIG. 17. Oxygen Consumption Versus Time for Tests 17. 180 g of 5.28 μm Hudson Bay Mixed copper concentrate in 1.2 L solution containing 3 g/L of $Cu^{2+}$, 3 g/L of $Fe^{2+}$, 3 g/L of $Fe^{3+}$, and 50 g/L of $H_2SO_4$ without extra acid and 0.18 g of Quebracho and 0.09 g of Lignosol under 150° C., 103 psi of $P_{O_2}$, 1000 rpm, 2 hours.

Figure 18:
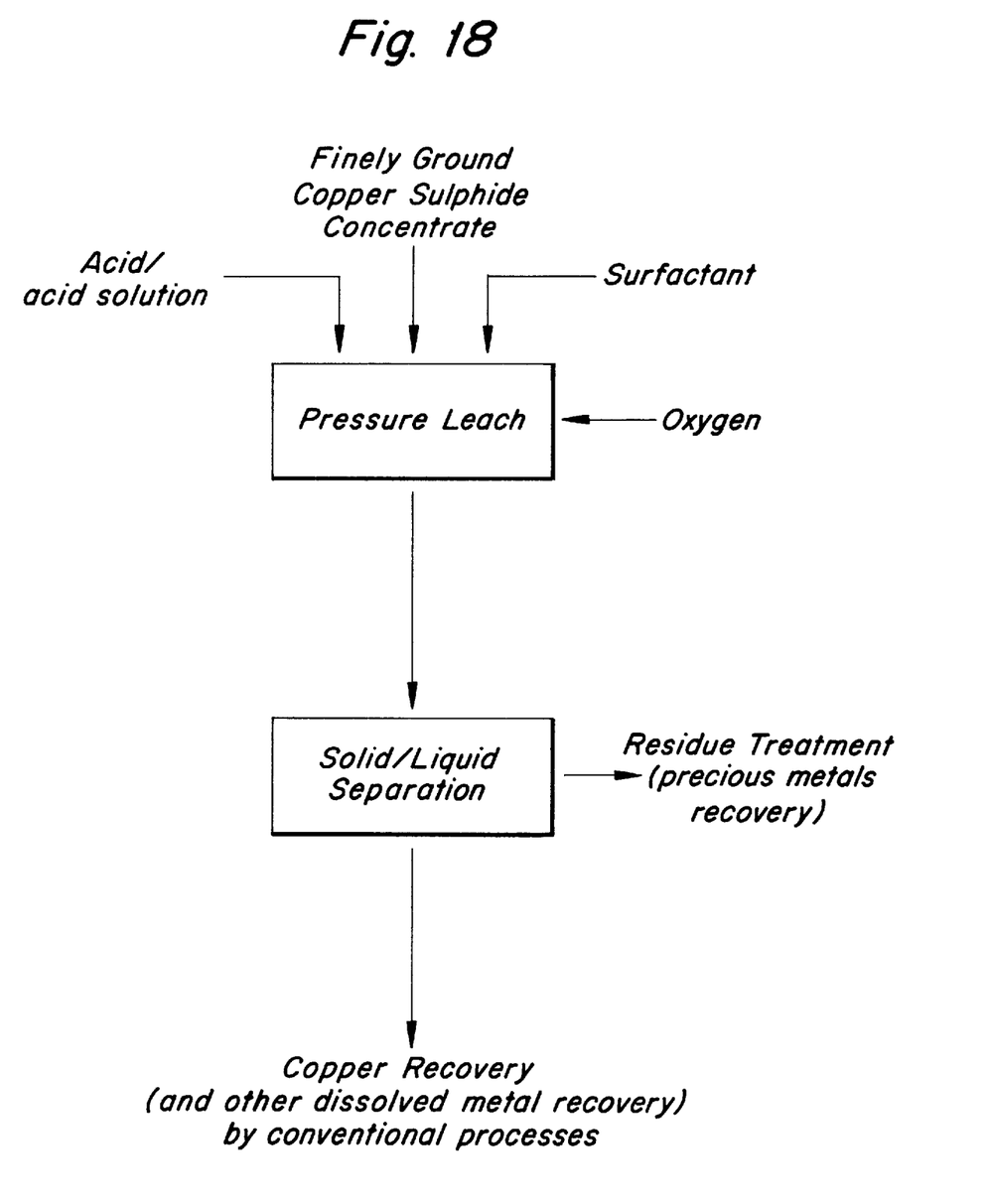
FIG. 18 is a conceptual process flowsheet.

Referring to FIG. 18, there is shown a schematic view of the process of the invention. It can be seen that finely ground copper sulphide concentrate, acid/acid solution, surfactant and oxygen are added into a pressure leach vessel.

The resulting product is then passed to a solid/liquid separation stage where there is recovered a final leach product containing copper values and other dissolved metal values which may then be sent to further processing for copper and other metal value recovery by conventional processes. There is also produced a solid residue which may be sent to a treatment stage for precious metal recovery.

The process of the invention works well on all concentrates tested. Typical copper extractions of plus 98% were achieved, often within two hours of autoclave leaching time.

Extra acid addition is not necessary to successfully leach copper from the chalcopyrite concentrates. Extra acid additions of 0, 125, 175, and 225 kg/tonne all gave similar results and copper extraction. Copper extractions in general were +98%.

Gold extraction from the residue was generally high with some leaches obtaining 95% extraction of gold.

Of the surfactants used, it appears that a combination of quebracho and lignosol is superior to OPD when considering 2 hour copper extraction values.

It is clear that the extraction of copper and sulphide oxidation is sensitive to particle size. From Table 5 it can be seen that the higher the agitation speed, the longer the phase separation time for all tests.

Pressure Oxidation—Concentrate C

Pressure Leach Conditions

Pressure oxidation was performed with a slurry consisting of 250 gram of solid and 1.0 liter solution. The initial solution contained 40 g/l Ni and 1 g/l Cu (II) and various acid concentrations intended to represent a spent electrolyte/recycle solution. Surfactants (1 kg/tonne solids each of lignin sulfonate and quebracho) were added to the slurry before the autoclave was sealed. The autoclave was then heated to 150° C. with agitation of 650 rpm. The autoclave conditions were:

Temperature 150° C.

Oxidation over pressure 7 atm (103 psi).

Stirring speed 1000 rpm.

Oxygen mass transfer rates were monitored during the test. No intermediate slurry samples were withdrawn during the run. When the test ended, the autoclave was cooled quickly, the slurry was filtered and washed thoroughly, The wet cake was dried in an oven at 50° C overnight.

Six pressure leach tests were performed. The conditions for each test are reported in Table 6.

TABLE 6

Conditions of Autoclave Leach (Concentrate C)

| Test ID | Material | Particle Size (P80) μm | Acid Requirement % of Stoichiometric | Surfactant |
|---|---|---|---|---|
| 18 | Concen. C | 19.28 | 80 | Y |
| 19 | Concen. C | 19.28 | 120 | Y |
| 20 | Concen. C | 15.20 | 80 | Y |
| 21 | Concen. C | 15.20 | 120 | Y |
| 22 | Concen. C | 10.60 | 80 | Y |
| 23 | Concen. C | 10.60 | 120 | Y |

For all tests 18 to 23 the temperature was 150° C., the $O_2$ pressure was 100 Psi, the agitation was 1000 rpm and the time taken was 2 hours.

Pressure Leach Results

The pressure research results for Concentrate C are shown in Table 7. Nickel, copper and cobalt extraction effeciencies were high. A decrease in copper concentration is shown with increasing particle size, verifying that the more finely ground chalcopyrite leaches more completely. Elemental sulphur yield was greater than for other concentrates tested.

TABLE 7

Results of Pressure Autoclave Leach (Concentrate C)

| Test ID | Material | Extraction (%) Ni | Cu | Co | Sulphide Oxidation (%) | Elemental Sulphur Yield (%) |
|---|---|---|---|---|---|---|
| 18 | Concen. C | 95.75 | 88.17 | 96.01 | 96.77 | 40.60 |
| 19 | Concen. C | 98.09 | 91.73 | 96.49 | 97.38 | 43.32 |
| 20 | Concen. C | 96.11 | 93.97 | 95.87 | 97.76 | 39.02 |
| 21 | Concen. C | 97.79 | 95.95 | 96.37 | 98.35 | 44.84 |
| 22 | Concen. C | 94.96 | 96.52 | 95.94 | 98.98 | 38.15 |
| 23 | Concen. C | 96.44 | 97.91 | 96.28 | 99.02 | 40.79 |

We claim:

1. A process for the extraction of copper from a copper sulphide containing concentrate also containing iron values, which comprises:

(a) dispersing finely divided copper sulphide containing concentrate having a P80 of from 5 micron to 20 micron inclusive in an aqueous sulphuric acid solution to form a slurry, the sulphuric acid being provided in an amount determined by the target copper, iron and acid concentration desired in the final leach solution;

(b) providing an effective amount of a suitable surfactant to disperse sulfur present in the slurry;

(c) reacting, with agitation, the slurry and surfactant with free oxygen bearing gas at an oxygen overpressure of from 100 kPa to 3000 kPa inclusive, in a pressure vessel at a temperature of from 130° C. to 160° C. inclusive, to extract the copper values from the concentrate to produce the final leach solution containing the dissolved copper values and a solid residue; and (d) separating the final leach solution containing the dissolved copper values from the solid residue so as to achieve a copper extraction of from 91.02% to 99.1%, wherein the effective amount of the surfactant is effective to achieve the copper extraction.

2. A process according to claim 1 wherein the copper sulphide containing concentrate comprises chalcopyrite.

3. A process according to claim 1 wherein the copper sulphide concentrate is selected from the group consisting of chalcocite, bornite, covellite, enargite and tetrahedrite.

4. A process according to claim 1 wherein the surfactant is selected from the group consisting of lignin derivatives, orthophenylene diamine, and alkanyl sulphonates, and a mixture of two or more thereof.

5. A process according to claim 4 wherein the surfactant is selected from the group consisting of lignosol, quebracho, and orthophenylene diamine, and a mixture of two or more thereof.

6. A process according to claim 1 wherein the surfactant is used in an amount of from 2 kg to 5 kg inclusive per tonne of the copper sulphide containing concentrate.

7. A process according to claim 1 wherein the oxygen overpressure in step (c) is from 4000 kPa to 750 kPa inclusive.

8. A process according to claim 1 wherein the temperature in step (c) is about 150° C.

9. A process according to claim 1 wherein in step (c) the free oxygen bearing gas is oxygen.

* * * * *